United States Patent
Saxena et al.

(10) Patent No.: US 10,740,221 B2
(45) Date of Patent: Aug. 11, 2020

(54) SCALABLE AI FRAMEWORK FOR TEST AUTOMATION

(71) Applicant: SAP SE, Walldorf (DE)

(72) Inventors: Sonam Saxena, Lucknow (IN); Samir Patil, Pen (IN); Warren Mark Fernandes, Mumbai (IN); Sai Phani Sharath Chandra Danthalapelli, Warangal (IN); Mithilesh Kumar Singh, Ara (IN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 16/160,356

(22) Filed: Oct. 15, 2018

(65) Prior Publication Data

US 2020/0117577 A1 Apr. 16, 2020

(51) Int. Cl.
*G06F 9/44* (2018.01)
*G06F 11/36* (2006.01)
*G06K 9/62* (2006.01)

(52) U.S. Cl.
CPC ........ *G06F 11/3664* (2013.01); *G06K 9/6262* (2013.01)

(58) Field of Classification Search
None
See application file for complete search history.

(56) References Cited

U.S. PATENT DOCUMENTS

2018/0189170 A1* 7/2018 Dwarakanath ...... G06F 11/3664

* cited by examiner

*Primary Examiner* — Qamrun Nahar
(74) *Attorney, Agent, or Firm* — Mintz Levin Cohn Ferris Glovsky and Popeo, P.C.

(57) ABSTRACT

In one aspect, there is provided a method for software testing. In one aspect, there is provided a method. The method may include executing a test script including at least one test instruction requiring an input at a user interface element displayed on a screen of a device under test; determining, based on a machine learning model, a candidate location on the screen of the device under test, the candidate location representing a candidate portion of the screen having the user interface element for the required input associated with the at least one test instruction; recognizing, based on optical character recognition, one or more characters in the determined candidate location; selecting, based on the recognized characters, the determined candidate location as the user interface element having the required input; and executing an inserted value at the determined candidate location to test a result of the test script execution.

14 Claims, 7 Drawing Sheets

Test Script 100

Operation A
Operation B
.
.
.
Fill on screen at "Company Code" field "!CC" —102

"!CC" properly displayed? —104

.
.
.

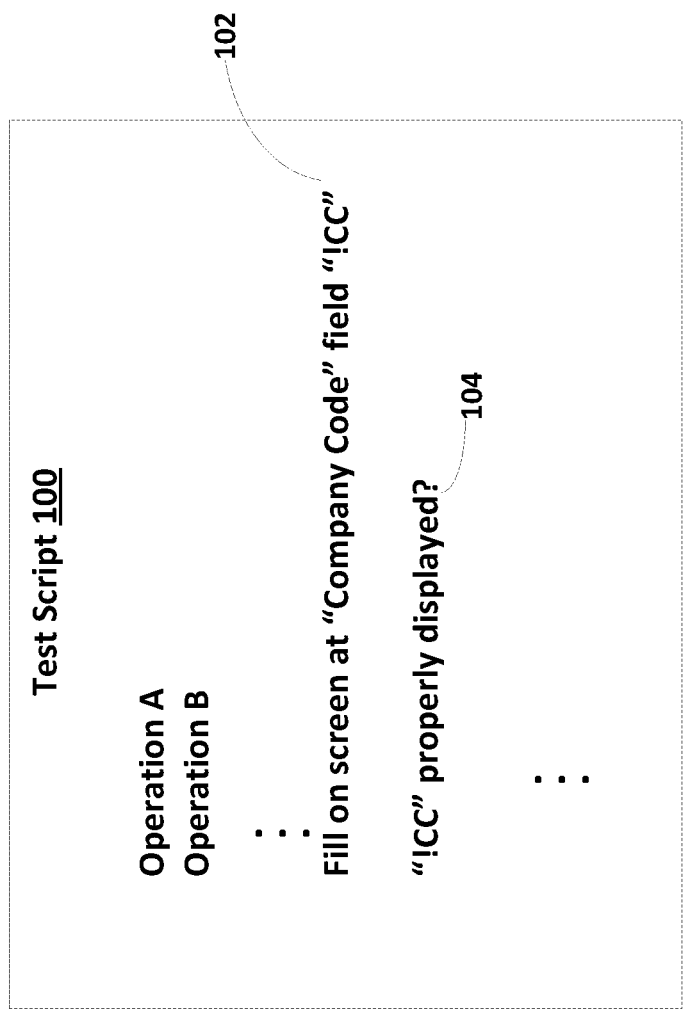

SCALABLE AI FRAMEWORK FOR TEST AUTOMATION

BACKGROUND

Testing software can be an intensively manual process. Despite the increasing use of software testing tools, software testing still requires people to verify much of the testing. To test software, the testing may need to deploy the software on various hardware platforms having different configurations, operating systems, peripherals, and the like. For example, a test script may be used to test an application running on different computers having different configurations. During testing, a portion of the test script may determine whether a test operation associated with a screen operates correctly. This type of testing typically requires a person to verify proper operation.

SUMMARY

In one aspect, there is provided a method. The method may include executing a test script including at least one test instruction requiring an input at a user interface element displayed on a screen of a device under test; determining, based on a machine learning model, a candidate location on the screen of the device under test, the candidate location representing a candidate portion of the screen having the user interface element for the required input associated with the at least one test instruction; recognizing, based on optical character recognition, one or more characters in the determined candidate location; selecting, based on the recognized characters, the determined candidate location as the user interface element having the required input; and executing an inserted value at the determined candidate location to test a result of the test script execution.

In some variations, one or more features disclosed herein including the following features can optionally be included in any feasible combination. The test script may be a higher-level language. The input may represent a user interaction including a character input at the user interface element displayed on the screen or a selection at the user interface element displayed on the screen. The determining may further include determining a plurality of candidate locations on the screen. The machine learning model may be trained to detect from images user interface elements. The machine learning model may be trained to detect user interface elements where a user interaction is present. The machine learning model may be a trained neural network. The recognizing may include scanning an image associated with the determined candidate location into characters and comparing the characters to test characters in the at least one test instruction. A document may be generated based on the test script, and the document may be representative of the test performed by the test script.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to the multiplication of database objects, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings, FIG. 1 depicts an example of a test script, in accordance with some example embodiments;

When practical, similar reference numbers denote similar structures, features, or elements.

DETAILED DESCRIPTION

FIG. 1 depicts an example of a test script 100, which may be a high-level script such as Ruby, Python, VBScript, or some other high-level script. In the example of FIG. 1, the test script includes a first test operation A, a second test operation B, and so forth. These test operations may be performed on a variety of different machines, some of which may have different configurations. The test script also includes a test operation 102 for verifying that a user interface element, such as "Company Code," is displayed properly on a screen and a test operation 104 for verifying that when an input value, such as "!CC," is input, during testing, into the user interface (UI) element, a proper result is displayed (or returned).

Although this above-noted test script example seems like a relatively simple task for a human, it is more difficult to perform in an automated way with a machine. For example, if the test is being performed across a plurality of different computers having different types (e.g., sizes) of screens, different operating systems, and the like, the UI element "Company Code" may appear in different portions of the display—making it more difficult to test as well as making it more difficult to provide an input value for that UI element. In some implementations, there is provided an automated software testing based on a machine learning model and an optical character recognizer.

Figure 2A:
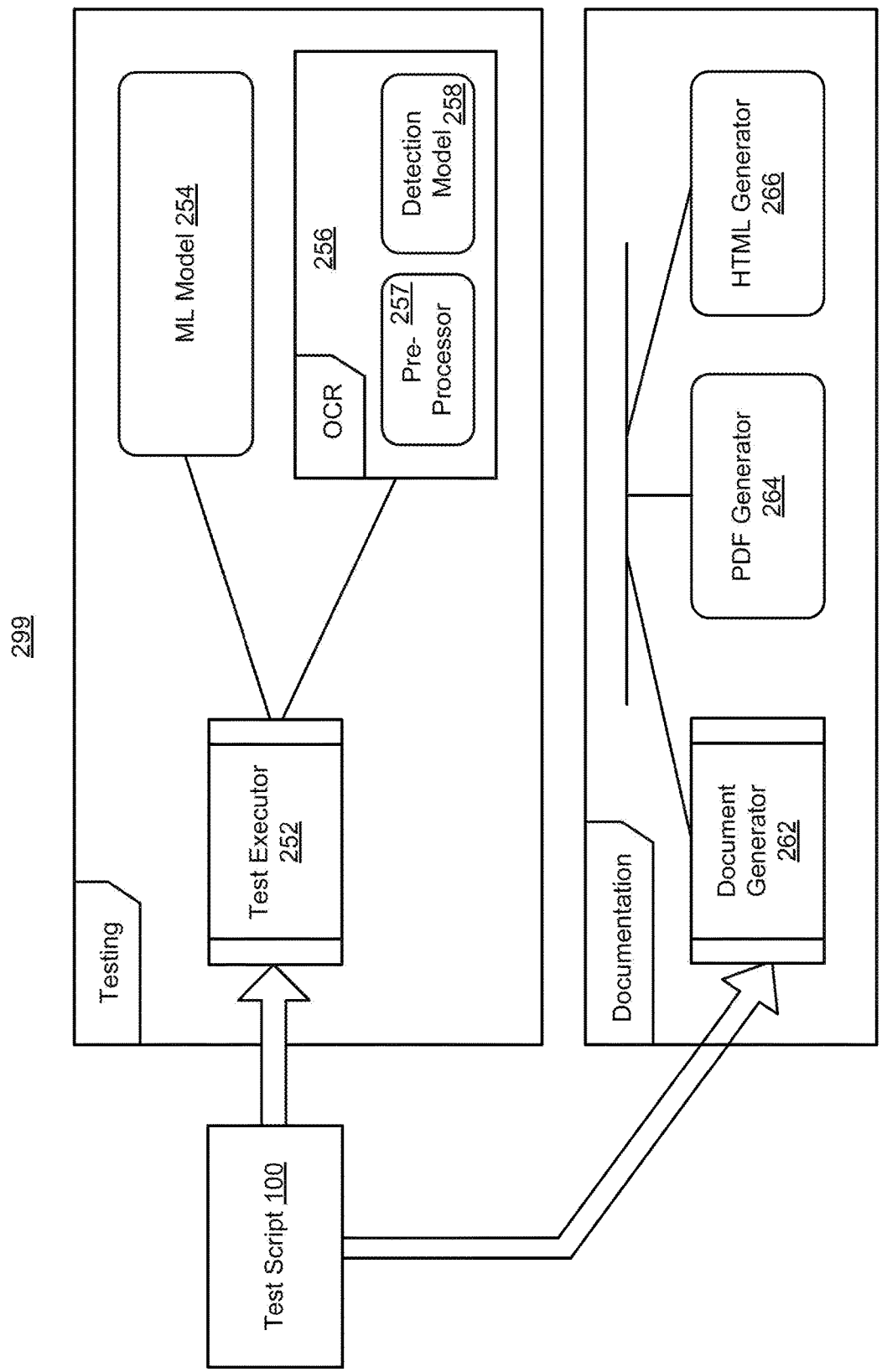
FIG. 2A depicts an example of a system, in accordance with some example embodiments.

FIG. 2A depicts an example of a system 299 for performing automated testing based on a machine learning model and an optical character recognizer. The system 299 may be implemented using at least one processor and at least one memory including program code to provide the functions, operations, and the like disclosed herein.

The system 299 may include a test executor 252, a machine learning model 254, and an optical character recognizer (OCR) 256. For example, the test executor 252 may receive a test script, such as test script 100. The test executor 252 controls the overall test sequence associated with the test script. The machine learning model 254 performs a machine learning task described further below with respect to FIG. 2B. The machine learning model may be implemented using a neural network, a deep learning neural network, a support vector machine, a clustering, Bayesian network, and/or other types of artificial intelligence (AI).

The OCR 256 performs OCR as noted further below with respect to FIG. 2B. The OCR 256 may include a preprocessor 257 for converting an image segmented from a screen into characters, and may further include a detection model 257 for detecting characters of interest.

The system 200 may also generate a test document from the test script. For example, the document generator 262 may generate a document summary of the testing in pdf form 264 or in HTML 266. The generated documents may be used to verify and/or document the testing.

Figure 2B:
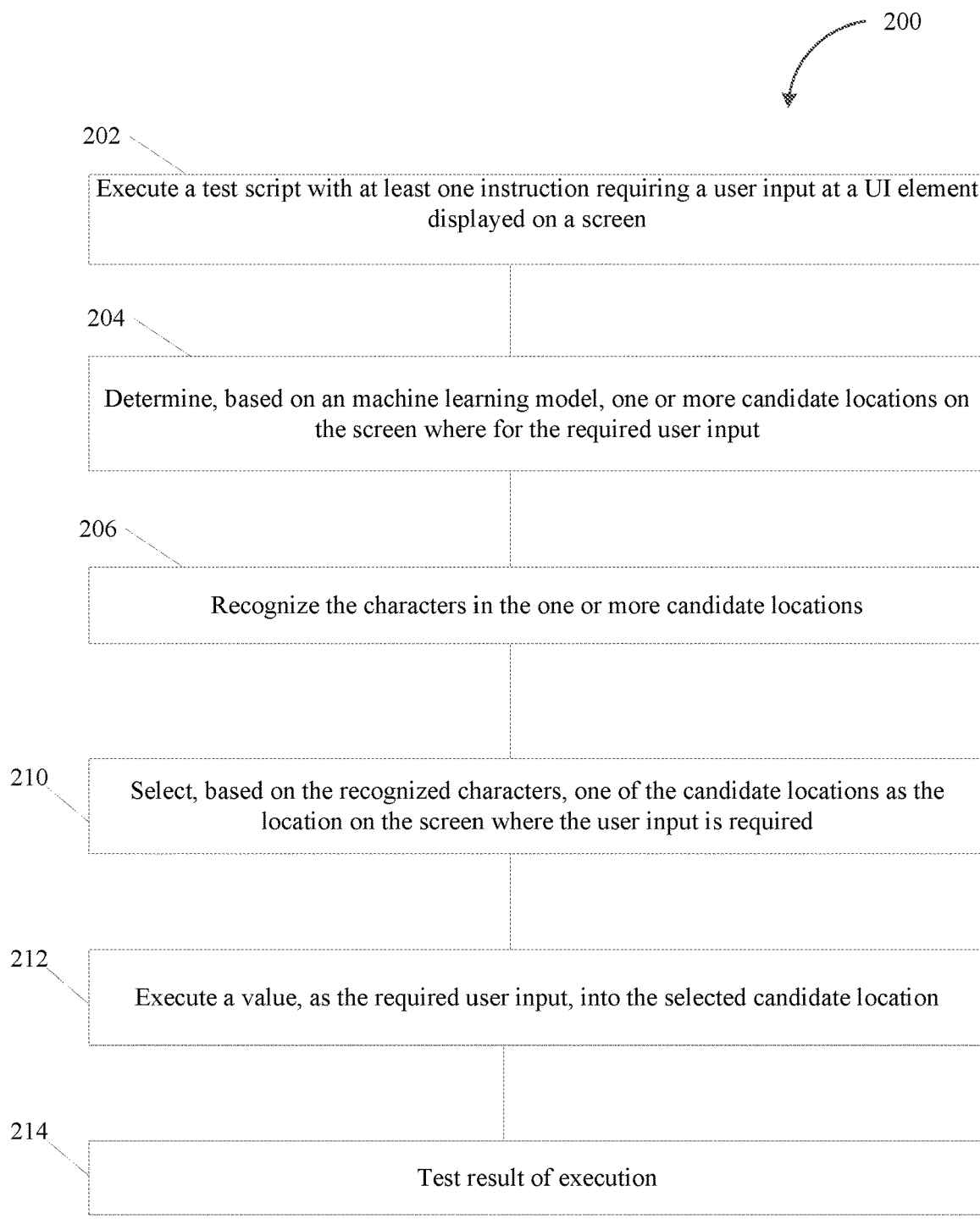
FIG. 2B depicts an example of a process flow for automated testing, in accordance with some example embodiments.

FIG. 2B depicts an example of a process 200 for performing automated testing using, a machine learning model and an optical character recognizer. The description of FIG. 2B also refers to FIGS. 1, 2A, and 3A-3C.

At 202, a test script may be executed with at least one instruction requiring an input at a UI element displayed on a screen. For example, the test executor 252 may execute a test script, such as test script 100, which includes at least one instruction, such as test operation 102 for the user interface element "Company Code." The test executor may test software operating on at least one device, such as a computer, a laptop, a smart phone, and/or other type of processor-based user device including memory. The at least one device may include a screen, such as screen 200 at FIG. 3A, displaying one or more user interface elements 302A-F. In the example of test script 100, the test executor performs the first test operation A at the user device, the second test operation at the user device, and then test operation 102 that tests an input value at the UI element 307C displayed on a screen 200. When not in testing, the UI element "Company Code" allows a user to input a company code at 307C. The test executor tests that user input by simulating the user input using the ML model 254 and OCR 256.

Figure 3A:
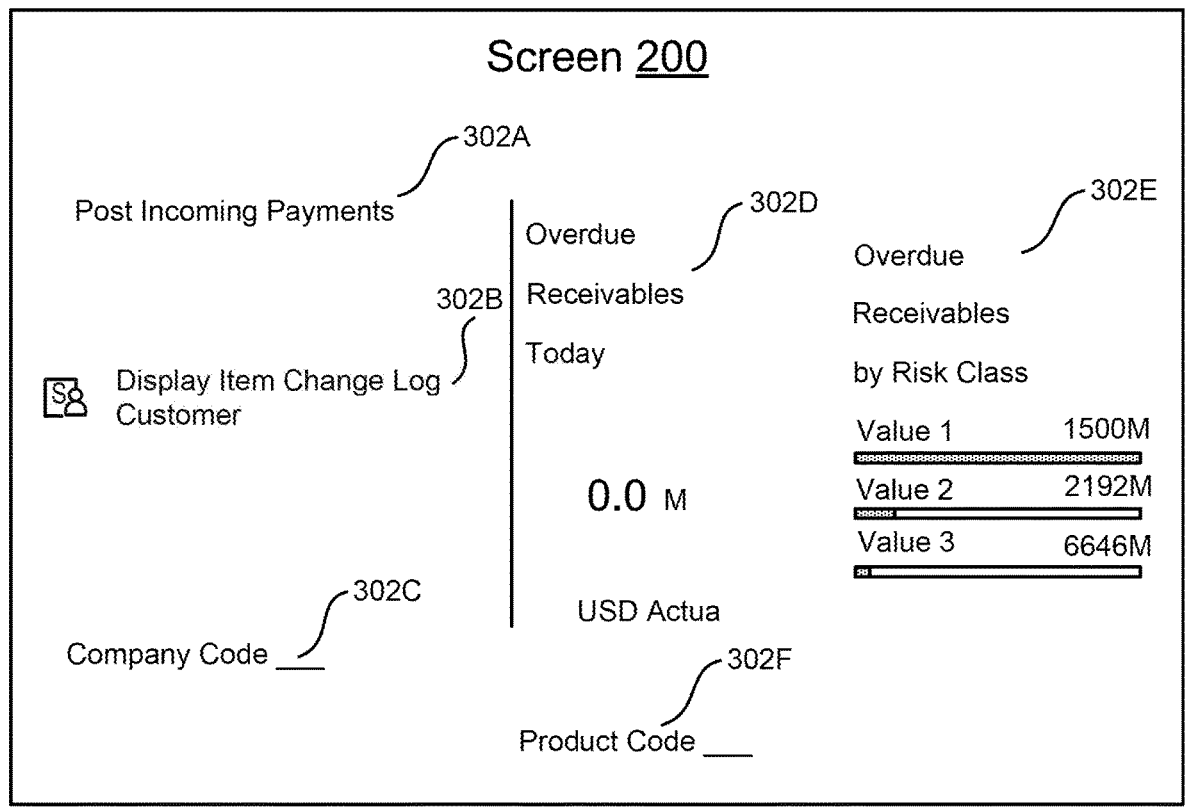
FIG. 3A-FIG. 3C depict examples of screens, in accordance with some example embodiments.
Figure 3B:
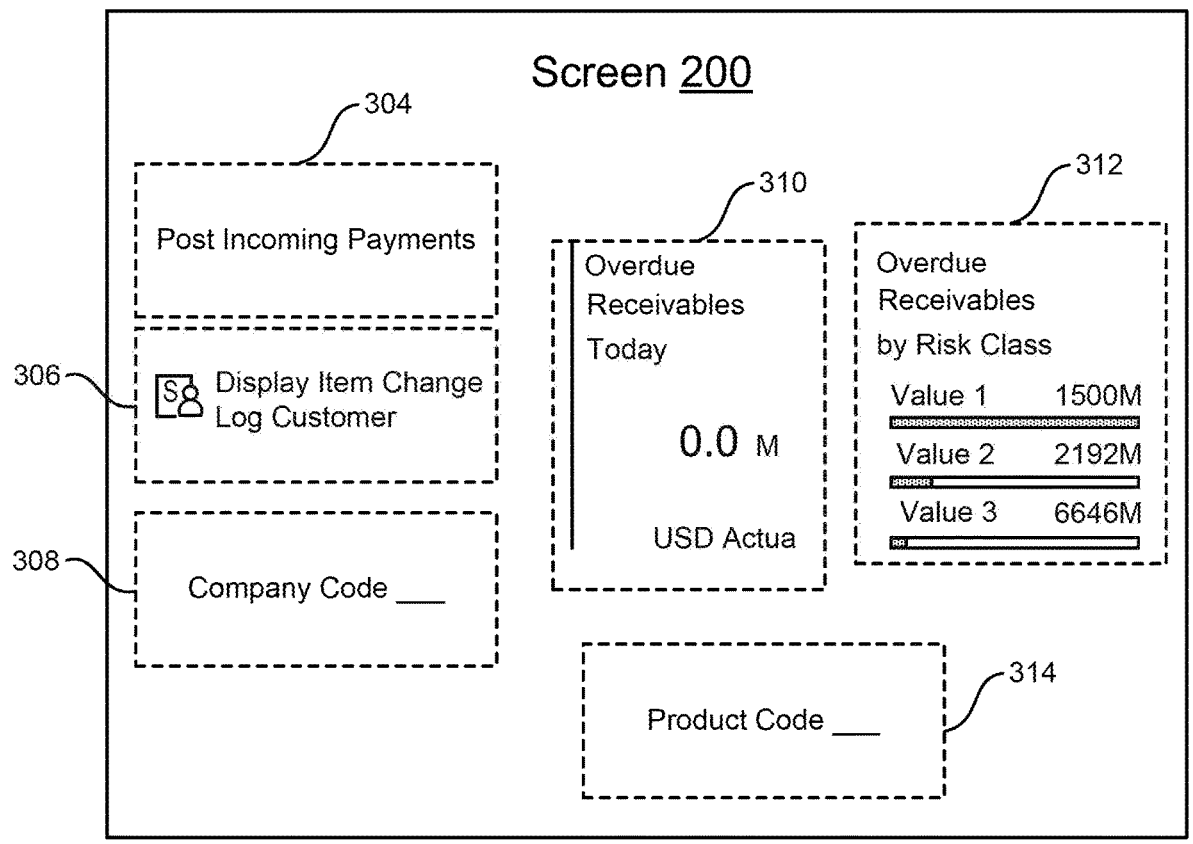
Figure 3C:
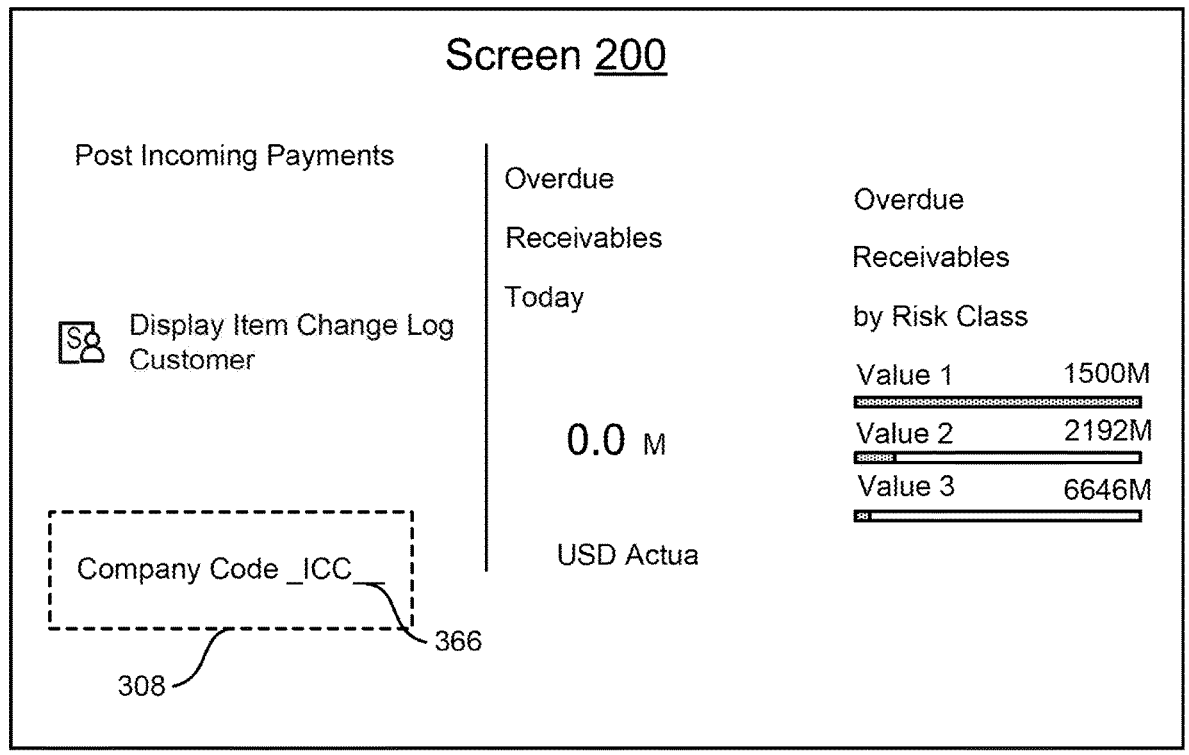

Although FIG. 3A-FIG. 3C depicts an example input as being a character input field, other types of user interactions, such as button clicks, drop down selections, on/off radio buttons, and the like may be tested as well.

At 204, one or more candidate locations on the screen being tested may be determined based on machine leaning model 254. For example, the test executor 252 may trigger the machine learning model 254 to determine one or more candidate locations (e.g., portions of the screens, segments, etc.) where there are UI elements present, such as UI elements 302A-F. In the example of FIG. 3A, at least two of the UI elements 307C and 307F require an input value, but only one is under test at 102 namely the "Company Code." In the example of FIG. 3A, the ML model may scan the screen 200 associated with a device being tested using the test script 100. At 204, the machine learning model may determine one or more candidate locations from the screen 200 where UI elements are present including UI elements where a user input may be required. In some implementations, the ML model may detect all UI interface elements on screen 200, in which case UI elements 302A-F would be detected as shown at FIG. 3B. In some implementations, only the UI elements where a user interaction (e.g., an input value, a selection, a button click, and the like that occurs during use of the software) is detected, in which case only Company Code 307C and Product Code 307F would be detected.

In some implementations, the machine learning model 254 is trained to detect and identify candidate locations from screen 200 where UI elements are present including UI elements where a user interaction, or input, may be required. For example, the machine learning model 254 may be implemented using a neural network trained using training data (e.g., images including examples of UI elements and/or UI elements having a user interaction) to detect and identify the UI where a user input may be required. FIG. 3B depicts an example of the one or more candidate locations detected and identified (as shown by the dashed boxes at 304-314) by the machine learning model.

At 206, the one or more candidate locations (which are determined at 204) are processed by the OCR 256. Referring to the test script example 100, the OCR 256 may preprocess each of the segmented regions 302-314 by converting the image portion of the segments 304-314 into characters. Next, the detection model 258 may search the scanned characters for the characters under test which in this example is the string "Company Code" corresponding to the UI element being tested at 102. For example, the detection model may compare the scanned text in each of the segments 302-314 to the string "Company Code" from the test script 102 to find a match. In this example, the comparison detects UI element 308 having the OCR scanned text "Company Code" which matches the "Company Code" 102 being tested. The characters (which in this example is "Company Code") are recognized (and thus detected) at 206, the test executor 252 may select, at 210, the corresponding segment having the recognized characters.

At 212, a value may be input as the required user input at the selected candidate location, and this input may be executed to obtain a result. Continuing with the previous example, the value "!CC" from the test script at 102 may be input into the selected candidate location 308 as shown in FIG. 3C and then executed to obtain a result.

At 214, the test executor 252 may test the result of the execution at 212. For example, the value "!CC" may be input at 366 into the selected candidate location 308 as shown in FIG. 3C. Next, the value "!ICC" may be executed (e.g., hit return and the like). In the test script example of 100, if the value "!ICC" is displayed properly without error message for example, the test operation is considered successful. If the test is not successful, an unexpected result may be displayed at screen 200, such as an "error" indication or some other type of result other than the display of "!ICC." When this is the case, the test executor 252 may flag an error for test operations 104 and document that error (e.g., record the result). At this point, the test executor may record the error and proceed with any additional test operations or stop or pause testing until the error is corrected.

As noted above, the test script 100 including any results of the testing may be used to document the testing performed. For example, the document generator 262 may generate a paper or electronic document listing the testing process undertaken by the test script and any results. This document may be stored, printed, or sent to various entities as part of the testing process to provide, for example, a reference manual.

In some implementations, the test executor 252 may receive a test script that is in a human-readable format and parse the test script into the individual test operations to be executed at 202. In some implementations, the test script may be in a high-level language with simple grammar and syntax that is easy to compose even for non-technical users. In some implementations, the test executor may convert the high-level language into a lower-level executable language for execution by the test executor 252.

In some implementations, the testing process 200 simulates more closely how an actual human interacts with the software and, in particular, screen 200 by detecting from the screen image the possible UI elements and then selecting the UI element to insert a value. This may yield more enhanced test results.

Figure 4:
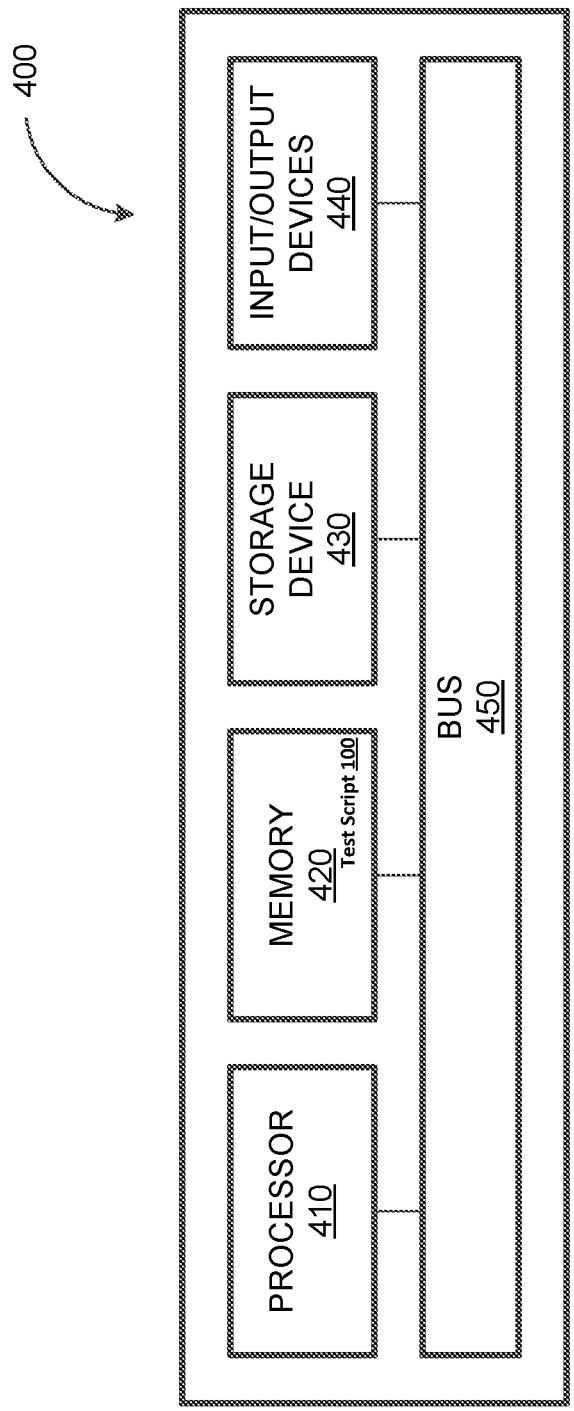
FIG. 4 depicts a block diagram illustrating a computing system, in accordance with some example embodiments.

FIG. 4 depicts a block diagram illustrating a computing system 400 consistent with implementations of the current subject matter. The computing system 400 may be used to host the system 299 and/or provide a host for the software under test which includes screen 200.

As shown in FIG. 4, the computing system 400 can include a processor 410, a memory 420 (which may include the test script 100), a storage device 430, and input/output devices 440. The processor 410, the memory 420, the storage device 430, and the input/output devices 440 can be interconnected via a system bus 450. The processor 410 is capable of processing instructions for execution within the computing system 400. Such executed instructions can implement one or more components of, for example, the system 299. In some implementations, the processor 410 can be a single-threaded processor. Alternately, the processor 410 can be a multi-threaded processor. The processor 410 is capable of processing instructions stored in the memory 420 and/or on the storage device 430 to display graphical information for a user interface provided via the input/output device 440, such as a screen, keyboard, and/or other input/output devices.

The memory 420 is a computer readable medium such as volatile or non-volatile that stores information within the computing system 400. The memory 420 can store instructions and/or other data associated with the processes disclosed herein. The storage device 430 is capable of providing persistent storage for the computing system 400. The storage device 430 can be a floppy disk device, a hard disk device, an optical disk device, a tape device, or other suitable persistent storage means. The input/output device 440 provides input/output operations for the computing system 400. In some example embodiments, the input/output device 440 includes a keyboard and/or pointing device. In various implementations, the input/output device 440 includes a display unit for displaying graphical user interfaces.

According to some example embodiments, the input/output device 440 can provide input/output operations for a network device. For example, the input/output device 440 can include Ethernet ports or other networking ports to communicate with one or more wired and/or wireless networks (e.g., a local area network (LAN), a wide area network (WAN), the Internet).

In some example embodiments, the computing system 400 can be used to execute various interactive computer software applications that can be used for organization, analysis and/or storage of data in various formats. Alternatively, the computing system 400 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities (e.g., SAP Integrated Business Planning as an add-in for a spreadsheet and/or other type of program) or can be standalone computing products and/or functionalities. Upon activation within the applications, the functionalities can be used to generate the user interface provided via the input/output device 440. The user interface can be generated and presented to a user by the computing system 400 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A system, comprising:
   at least one data processor; and
   at least one memory storing instructions which, when executed by the at least one data processor, cause operations comprising:
   executing a test script including at least one test instruction requiring an input at a user interface element displayed on a screen of a device under test;
   determining, based on a machine learning model, all candidate locations on the screen of the device under test, each of the candidate locations representing a candidate portion of the screen having a corresponding user interface element;
   scanning all of the candidate locations on the screen of the device under test;
   recognizing, based on an optical character recognition, one or more characters for each of the corresponding scanned candidate locations;
   selecting, based on the recognized one or more characters matching one or more test script characters for the required input, one of the candidate locations as the user interface element having the required input;
   executing an inserted value at the selected candidate location to test a result of the test script execution; and
   generating a document representative of the result of the test script execution.

2. The system of claim 1, wherein the test script is a higher-level language.

3. The system of claim 1, wherein the input represents a user interaction including a character input at the user interface element displayed on the screen or a selection at the user interface element displayed on the screen.

4. The system of claim 1, wherein the machine learning model is trained to detect from images user interface elements.

5. The system of claim 1, wherein the machine learning model is trained to detect user interface elements where a user interaction is present.

6. The system of claim 5, wherein the machine learning model is a trained neural network.

7. A method comprising:
   executing a test script including at least one test instruction requiring an input at a user interface element displayed on a screen of a device under test;
   determining, based on a machine learning model, all candidate locations on the screen of the device under test, each of the candidate locations representing a candidate portion of the screen having a corresponding user interface element;
   scanning all of the candidate locations on the screen of the device under test;
   recognizing, based on an optical character recognition, one or more characters for each of the corresponding scanned candidate locations;
   selecting, based on the recognized one or more characters matching one or more test script characters for the required input, one of the candidate locations as the user interface element having the required input;
   executing an inserted value at the selected candidate location to test a result of the test script execution; and
   generating a document representative of the result of the test script execution.

8. The method of claim 7, wherein the test script is a higher-level language.

9. The method of claim 7, wherein the input represents a user interaction including a character input at the user interface element displayed on the screen or a selection at the user interface element displayed on the screen.

10. The method of claim 7, wherein the machine learning model is trained to detect from images user interface elements.

11. The method of claim 7, wherein the machine learning model is trained to detect user interface elements where a user interaction is present.

12. The method of claim 11, wherein the machine learning model is a trained neural network.

13. A non-transitory computer-readable storage medium including program code which when executed causes operations comprising:
- executing a test script including at least one test instruction requiring an input at a user interface element displayed on a screen of a device under test;
- determining, based on a machine learning model, all candidate locations on the screen of the device under test, each of the candidate locations representing a candidate portion of the screen having a corresponding user interface element;
- scanning all of the candidate locations on the screen of the device under test;
- recognizing, based on an optical character recognition, one or more characters for each of the corresponding scanned candidate locations;
- selecting, based on the recognized one or more characters matching one or more test script characters for the required input, one of the candidate locations as the user interface element having the required input;
- executing an inserted value at the selected candidate location to test a result of the test script execution; and
- generating a document representative of the result of the test script execution.

14. The non-transitory computer-readable storage medium of claim 13, wherein the machine learning model is trained to detect user interface elements where a user interaction is present.

* * * * *